United States Patent
Hamlin

[11] Patent Number: 6,130,992
[45] Date of Patent: Oct. 10, 2000

[54] SELF PORTRAIT CAMERA

[76] Inventor: Walter Hamlin, 601 Park Blvd., Muskogee, Okla. 74401

[21] Appl. No.: 09/360,829

[22] Filed: Jul. 26, 1999

[51] Int. Cl.[7] .................................................. G03B 13/02
[52] U.S. Cl. ................................ 396/6; 396/281; 396/376
[58] Field of Search ................................. 396/6, 281, 376

[56] References Cited

U.S. PATENT DOCUMENTS

| | | | |
|---|---|---|---|
| 2,868,096 | 1/1959 | Rothfjell | 396/420 |
| 2,951,429 | 9/1960 | Leong | 396/138 |
| 3,195,431 | 7/1965 | Augustin | 396/199 |
| 4,530,580 | 7/1985 | Ueda et al. | 396/425 |
| 5,565,947 | 10/1996 | Chemberlain, IV | 396/376 |
| 5,768,645 | 6/1998 | Kessler | 396/376 |

Primary Examiner—W. B. Perkey
Attorney, Agent, or Firm—William S. Dorman

[57] ABSTRACT

A camera comprising a rectangle housing having a front face, a top surface and a bottom, a shutter trigger located along the top of the camera for operating the conventional shutter of the camera, a pair of sighting arms extending divergently and symmetrically outwardly from the front face of the camera in a plane at right angles thereto, whereby an operator of the camera can hold the housing at arms length from his body with his index finger adjacent the shutter trigger, and whereby the operator can sight along one of the sighting arms while turning the camera towards himself, the operator being certain that he can see an inboard side that sighting arm to insure that his face will be in at least part of the picture to be taken upon actuation of the shutter trigger by his index finger, the sighting arms being connected to the top of the camera by a hinged adapter which will permit the sighting arms to be folded so as to lie against the front face of the camera.

3 Claims, 2 Drawing Sheets

SELF PORTRAIT CAMERA

BACKGROUND OF THE INVENTION

1. Field of the Invention

The present invention relates to a hand-held or self-portrait camera which is utilized to take a picture of the person holding the camera. The user (operator) of the camera simply holds the camera out at arms length and turns the camera backwards towards the body or the face of the operator. More particularly, the present invention relates to alignment arms on the camera which will guide the operator so that the face or a selected portion of the operator will appear in a predetermined position in the ultimate picture taken.

2. Prior Art

Disposable cameras have become very popular, especially because they are relatively inexpensive and readily available. They can be purchased with preloaded film and flash lights. They are particularly convenient when traveling or at parties. However, current disposable cameras are inconvenient for taking your own photograph.

When a camera is used to take self-portrait pictures, it is usually held away from the user and pointed back towards the user. Such an arrangement makes it generally difficult for the user to know his own position within the coverage of the lens or his position relative to other objects within the scene to be photographed.

A patentability search was conducted on the above invention and the following references were uncovered in the search.

| Deleeuw | 5,576,781 | Issued Nov. 19, 1996 |
| --- | --- | --- |
| Fredrickson | 4,984,371 | Issued Jan. 15, 1991 |
| Lupis | 4,283,135 | Issued Aug. 11, 1981 |
| Dine | 3,836,927 | Issued Sept. 17, 1974 |
| Ellman | 3,385,188 | Issued May 28, 1968 |
| Pollock | 3,539,324 | Issued Jan. 23, 1951 |
| Nicholas | 2,667,825 | Issued Feb. 2, 1952 |
| Luboshez | 2,434,172 | Issued Jan. 6, 1948 |
| Leong | 2,951,429 | Issued Sept. 6, 1960 |
| Augustin | 3,195,431 | Issued July 20, 1965 |
| Kessler | 5,768,645 | Issued Jun. 16, 1998 |
| Ueda et al | 4,530,580 | Issued Jul. 23, 1985 |
| Rothfjell | 2,868,096 | Issued Jan. 13, 1959 |

The Leong patent is considered pertinent merely in that it discloses an attachment for a camera that extends at an angle to indicate the field of view of the lens. The Augustin patent is considered pertinent in that it discloses two rods that extend from the front of the camera to measure focal length. However, neither Leong nor Augustin deal with the problem of self portraiture, and neither teaches or suggests the invention disclosed herein.

The only patents which even discuss the self-taking of pictures are the Kessler, Ueda et al, and Rothfjell patents, none of which disclose arms at the top of the camera, such as in the present invention, for guiding the operator so that his picture will always be within the ambit of the lens. Although the last three patents discuss the self-taking of pictures or self-portraiture, none of them disclose a pair of arms that are at the top of the camera to assist the operator of being sure that his face is going to be in the picture.

SUMMARY OF THE INVENTION

The present invention relates to a camera, preferably disposable, to be used by the operator for taking his own picture. The camera itself comprises a rectangular housing having a front face, a top surface and a bottom. A lens assembly is located within the housing and extends to a front opening in the front face of the camera. The front opening also includes a conventional shutter which can be actuated by a shutter trigger which is located along the top of the camera. The camera is provided with a pair of sighting arms which extend divergently outwardly from the top front edge of the camera at right angles to the front face of the camera. These sighting arms are connected to the camera by means of a hinged adapter which will permit the sighting arms to be folded against the front face of the camera. The included angle between the two sighting arms is preferably about 60 degrees. When the operator of the camera wishes to take a picture of himself, in conjunction with other people or other background matter, he holds the camera in his hand at arms length with his index finger adjacent the shutter trigger. He will sight along the left-hand sighting arm (for example) and as long as he can see a portion of the right side (inboard) of this sighting arm, his face will appear in the picture to be taken. If he wishes his face to be in the center of the picture, he will turn the camera so that he is looking at a spot equi-distant between the two sighting arms.

DETAILED DESCRIPTION OF THE PREFERRED EMBODIMENTS

Figure 2:
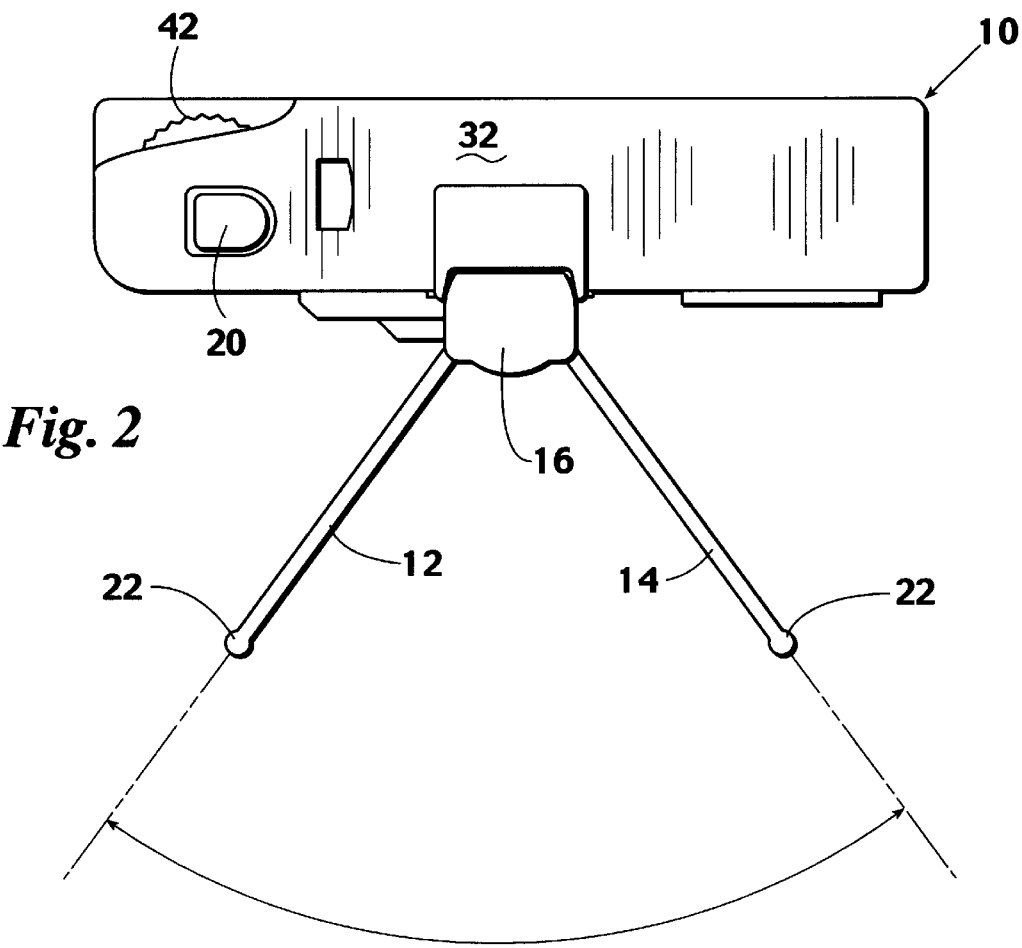
FIG. 2 is a plan view of the camera shown in FIG. 1.
Figure 1:
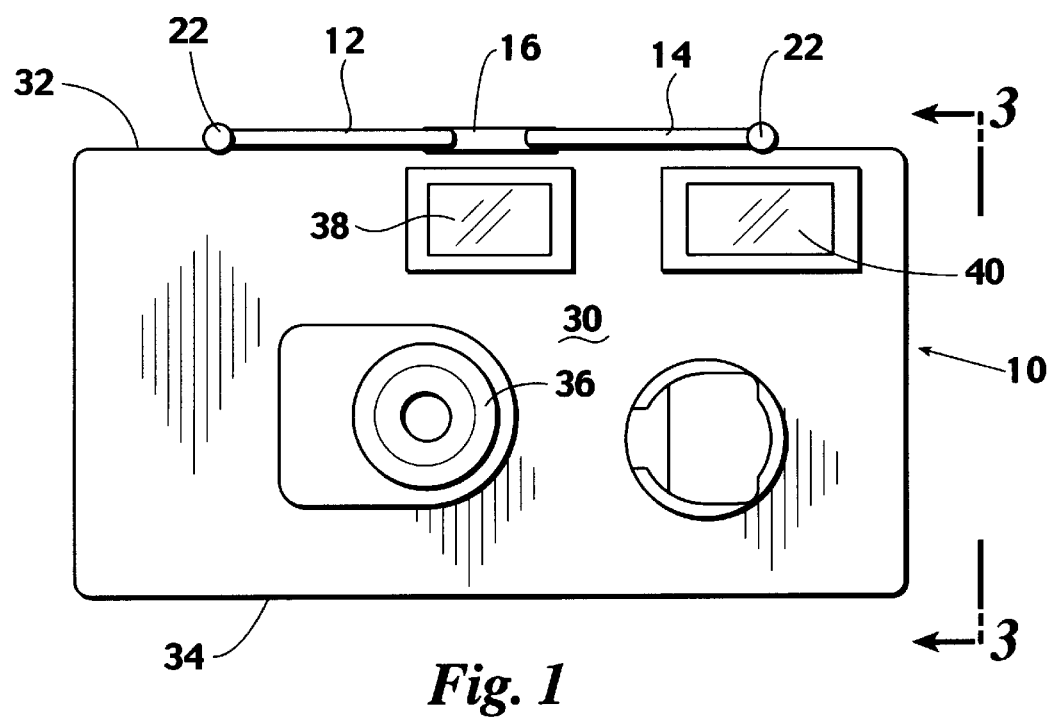
FIG. 1 is a front elevation of a camera made in accordance with the present invention.

Referring to the drawings in detail, FIGS. 1 and 2 show a camera 10 provided with a pair of divergent arms or spikes 12 and 14 connected to the top front edge of the camera by means of a hinged adaptor 16. The arms 12 and 14 extend symmetrically outwardly from the front face 30 of the camera and constitute sighting or alignment means as will hereinafter appear.

The camera 10 comprises a rectangular housing having a front face 30, a top surface 32 and a bottom 34. A lens assembly (not shown) is located within the housing and extends to a front opening 36 in the front face 30. The front opening 36 includes a conventional shutter (not shown) which can be actuated by the shutter trigger 20 which is located along the top 32. The front face 30 will generally include a view finder 38 and a flash (light) 40. The camera will be pre-loaded with film, generally color film, with multiple exposures. The film can be advanced by the wheel 42 located along the top 32.

Figure 5:
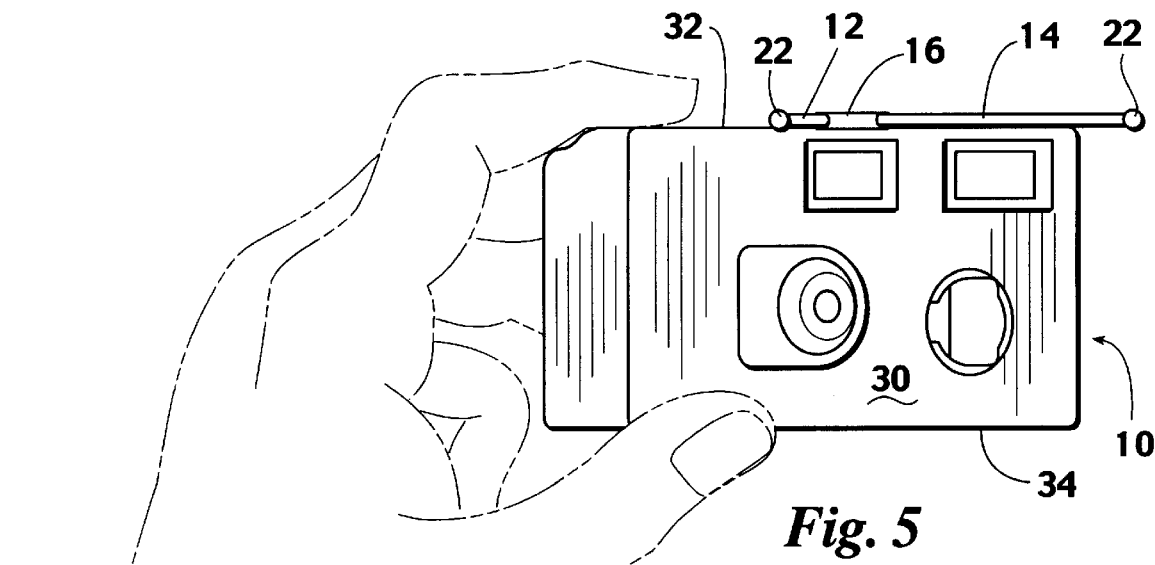
FIG. 5 is a perspective view showing an operator holding the camera of the present invention utilizing the sighting arms.
Figure 3:
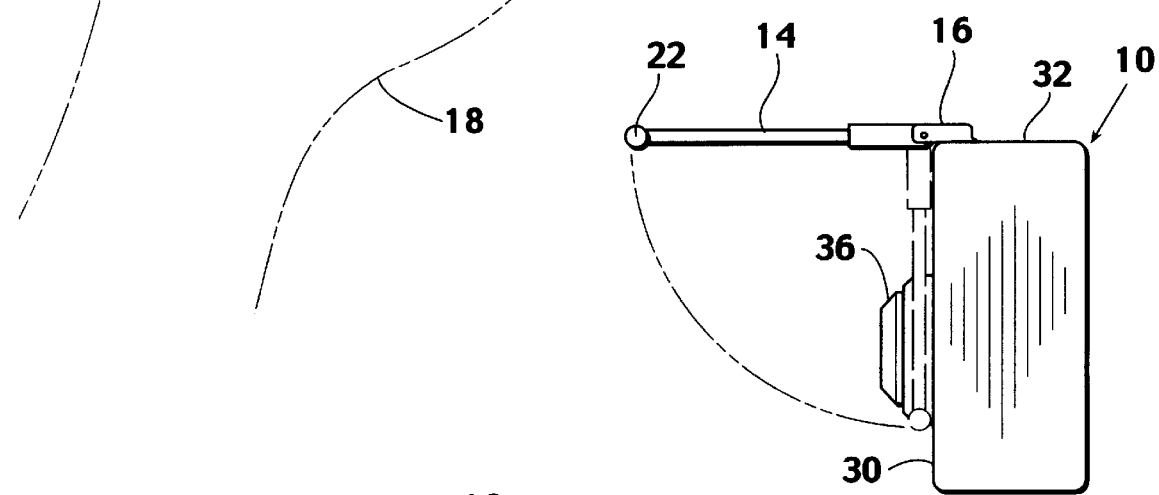
FIG. 3 is a view taken along line 3—3 of FIG. 1 showing the foldability of the arms.
Figure 4:
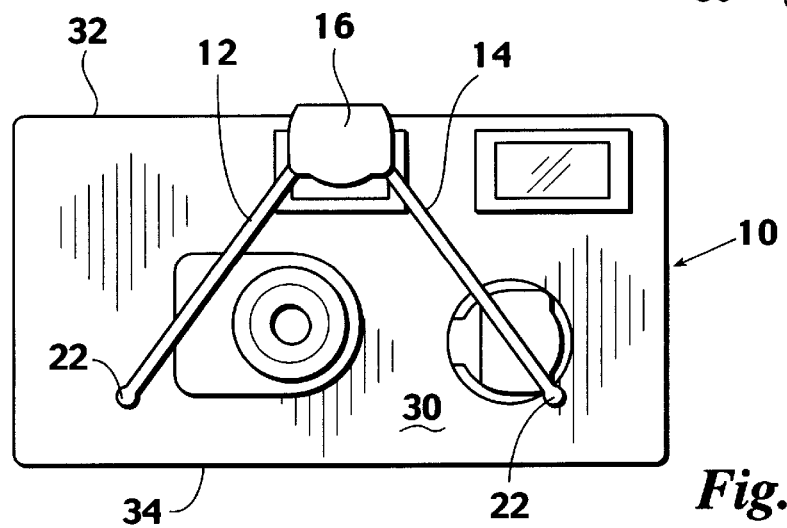
FIG. 4 is a view similar to FIG. 1 but showing the progression of the folding of the arms to the front of the camera from the FIG. 3 position.

When the camera is in use, the arms 12 and 14 will be in an essentially horizontal plane (perpendicular to the front face 30 of the camera) as shown in FIGS. 1, 2, and 5. However, when the camera is in its carrying case (not shown) or box of purchase (not shown), it is preferable that the arms 12 and 14 be folded flat against the front face of the camera 10 as shown in FIG. 4. Therefore, the adapter 16, which is mounted along the forward edge of the top 32, is hinged as shown in FIG. 3 so that it can swing from the FIG. 3 position to the FIG. 4 position.

When the operator (not shown) wishes to take a picture of himself in conjunction with other people or other background matter, he holds the camera in his hand 18 as shown in FIG. 5 with his index finger adjacent the operating button or shutter trigger 20 shown in FIG. 2. If for example, he wishes his face to be in the left-hand portion of any picture taken by the camera 10 shown in FIG. 5, he will sight along the sighting arm 12, for example, and as long as he can see a portion of the arm 12 to the right (inboard) of its end 22 he knows that his face will be in the picture. Actually, his face will be in the picture if he can see the inboard side of either arm which is pointed generally toward him. The ends 22 can be enlarged as shown, if desired. If the operator wants his face in the center of the picture he will adjust the camera so that he is looking at a point equidistance between the two ends 22. The angle between the arms 12 and 14 is not critical, but is preferably approximately 60 degrees.

What is claimed is:

1. A camera comprising a rectangle housing having a front face, a top surface and a bottom, a shutter trigger located along the top of the camera for operating the conventional shutter of the camera, a pair of sighting arms extending divergently and symmetrically outwardly from the front face of the camera in a plane at right angles thereto, whereby an operator of the camera can hold the housing at arms length from his body with his index finger adjacent the shutter trigger, and whereby the operator can sight along at least one of the sighting arms while turning the camera towards himself, the operator being certain that he can see an inboard side of the arm being sighted to insure that his face will be in at least part of the picture to be taken upon actuation of the shutter trigger by his index finger.

2. A camera as set forth in claim 1 wherein the sighting arms are connected to the top of the camera by means of a hinged adapter which will permit the sighting arms to be folded so as to lie against the front face of the camera.

3. A camera as set forth in claim 1 wherein the included angle between the sighting arms is preferably about 60 degrees and wherein the camera is disposable.

* * * * *